United States Patent [19]

Sidhu et al.

[11] Patent Number: 4,541,025
[45] Date of Patent: Sep. 10, 1985

[54] CONTROL ROD FOR CLUTCH ACTUATOR FOR FLOPPY DISK DRIVE

[76] Inventors: Pawitter S. Sidhu, 2900 Corda La., Bel Air, Calif. 90049; Gary M. Delgado, 1745 Carmelina Ave., Los Angeles, Calif. 90025

[21] Appl. No.: 427,597

[22] Filed: Sep. 29, 1982

[51] Int. Cl.³ .................... G11B 5/016; G11B 5/012
[52] U.S. Cl. .................................. 360/99; 360/97
[58] Field of Search ............... 360/99, 97, 98, 86, 360/137, 135, 132, 93; 74/89.2

[56] References Cited

U.S. PATENT DOCUMENTS

| | | | |
|---|---|---|---|
| 4,040,107 | 8/1977 | Bryer | 360/99 |
| 4,179,718 | 12/1979 | Rolph | 360/99 |
| 4,339,778 | 7/1982 | Wise | 360/98 |
| 4,409,629 | 10/1983 | Puls | 360/97 |

Primary Examiner—Robert M. Kilgore
Attorney, Agent, or Firm—Evanns & Walsh

[57] ABSTRACT

A control mechanism for floppy disk drive units. A single control rod having cam lobes is mounted with an operating end extending through the front bezel of the unit. The control rod has a lobe cooperating with surfaces to establish positive loaded and unloaded positions of the driving cone and spindle of the unit. The driving cone is carried from an arm having an actuating spring cooperating with a lobe of the control rod. The actuating spring has angular detent parts whereby the control rod moves with a snap action between loaded and unloaded positions of the cone. The control rod has a further cam lobe carrying a pressure pad which comes into contact with the diskette in the loaded position along with an arm dropped or loaded with the head.

8 Claims, 7 Drawing Figures

CONTROL ROD FOR CLUTCH ACTUATOR FOR FLOPPY DISK DRIVE

BACKROUND OF THE INVENTION

1. Field of the Invention

The field of the invention is that of floppy disk drive units or assemblies particularly adapted for use in mini and mirco computers. The invention is particularly concerned with a control mechanism for the drive clutch and the other controlled parts in a device of this type which is shallow or that is low in profile so as to occupy a minimum of space.

2. Description of the Prior Art

U.S. Pat. Nos. 4,139,876 and 4,170,146 are referred to as background to identify floppy disk drive units of a type to which the invention relates.

Needless to say, computers are extensively used in industry today, there being many different types. Typically, a computer system involves components including input devices; storage devices; a memory; the central processing unit (C.P.U.); and output devices. Software has reference to the programs which are the data that are fed into the computer.

A problem or deficiency as appeared in the prior art relative to simplification of the required manual control of the drive unit particularly a floppy disk drive unit occupying a mininmum space, that is, a unit that is shallow or low in profile.

The prior art has not acheived simplified control mechanism for the operative components of the drive, especially the drive cone and the pressure pads for the disk or diskette and the magnetic head.

The herein invention, a preferred exemplary form of which is described hereinafter in detail, overcomes the deficiencies of the prior art and provides additional advantages as referred to in detail hereinafter.

SUMMARY OF THE INVENTION

A preferred exemplary form of the invention is described in detail hereinafter.

In a preferred form of the invention it is embodied in a disk drive unit having a relatively shallow chassis as disclosed in application Ser. No. 427,600, filed Sept. 29, 1982 having common ownership.

In the preferred form of the invention the drive unit is controlled by a single control rod having a manual operating handle, which is on the outside of the front bezel of the unit. The control rod controls the loading and unloading of the clutch cone that engages the drive spindle of the unit whereby the diskette is driven. In a preferred construction a slot is provided in a front bezel and guide ways in the chassis to receive the diskette in a position for operation with the opening in the diskette in position between the drive cone and the drive spindle, which are of low profile construction accommodated to the shallow or low profile construction of the chassis. An arm is provided with an actuation spring which carries the drive cone and which is moveable between loaded and unloaded positions with respect to the drive spindle.

The control rod is a single rod having bent parts or lobes by which the operating functions are achieved. The arm that carries the drive cone carries the actuation spring and it has angular bent parts forming detents which cooperate with a cam lobe in the control rod to positively determine the loaded and unloaded positions of the drive cone and the spindle. The actuation spring is positioned underneath the arm that carries the drive cone to accommodate to the shallow low profile construcation of the chassis. The control rod can be turned by a manual knob between two position which are positively established established by angular detent formations formed in the actuation spring which cooperate with a cam lobe in the control rod.

The control rod has a further cam lobe which in the loaded position moves a pressure pad into a position to apply pressure to the diskette and to load an arm over the magnetic head.

In the light of the foregoing, the primary object of the invention is to realize an improved manual control mechanism or system especially adapted for a floppy disk drive unit wherein the necessary operations are effected positively by way of a simplified mechanism.

A further object is to realize a control mechanism as in the foregoing object in the form of a single rod having bends in it forming cam lobes which is mounted to overlie the chassis of the drive unit and which has the cam lobes positioned to perform the operative control functions.

Another object is to realize a control rod assembly as in the foregoing wherein the control rod has a first cam lobe positioned to positively establish loaded and unloaded positions of the drive cone and the spindle; a second cam lobe to operate the drive cone between its loaded and unloaded positions; and a third lobe carrying a pressure pad operative to apply pressure to the diskette when in position along with loading an arm carrying a pressure pad. In unloaded position the upper loading arm is lifted away from the head to allow insertion or removal of the floppy disk from the head.

Further objects and advantages of the invention will become apparent from the following drawings and detailed description.

BRIEF DESCRIPTION OF THE DRAWINGS

FIG. 3a is a sectional view taken along line 3a—3a of FIG. 3.

DESCRIPTION OF A PREFERRED EMBODIMENT AND BEST MODE OF PRACTICE

The chassis for the disk drive unit is fabricated by plastic injection molding in a single piece from a conductive plastic material. The chassis is shallow, that is, of low profile.

The chassis as shown is like that of application Serial No. 427,600 filed Sept. 29, 1982 having the same ownership as this application.

Figure 1:
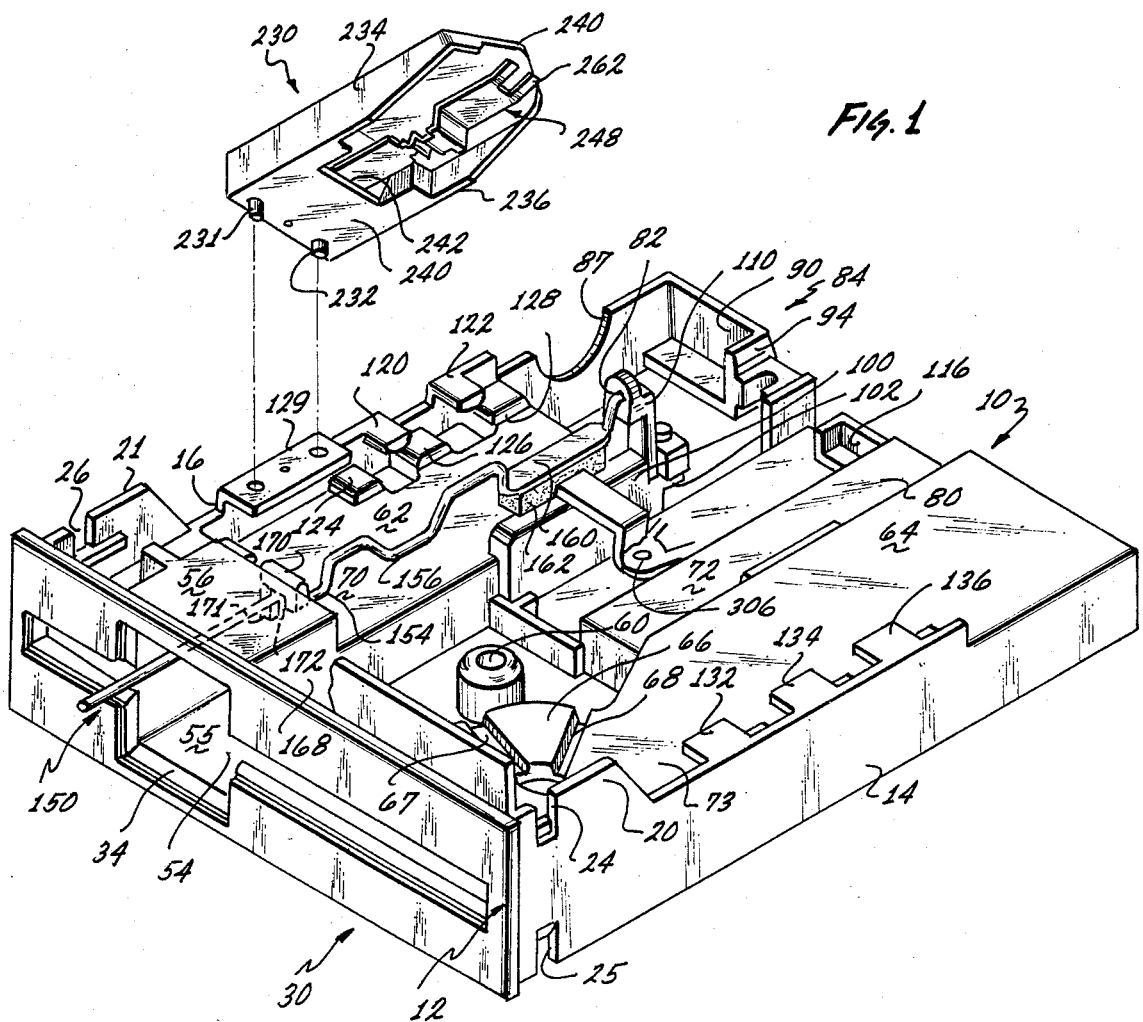
FIG. 1 is an isometric view of a preferred form of the invention, assembled in a chassis.
Figure 3:
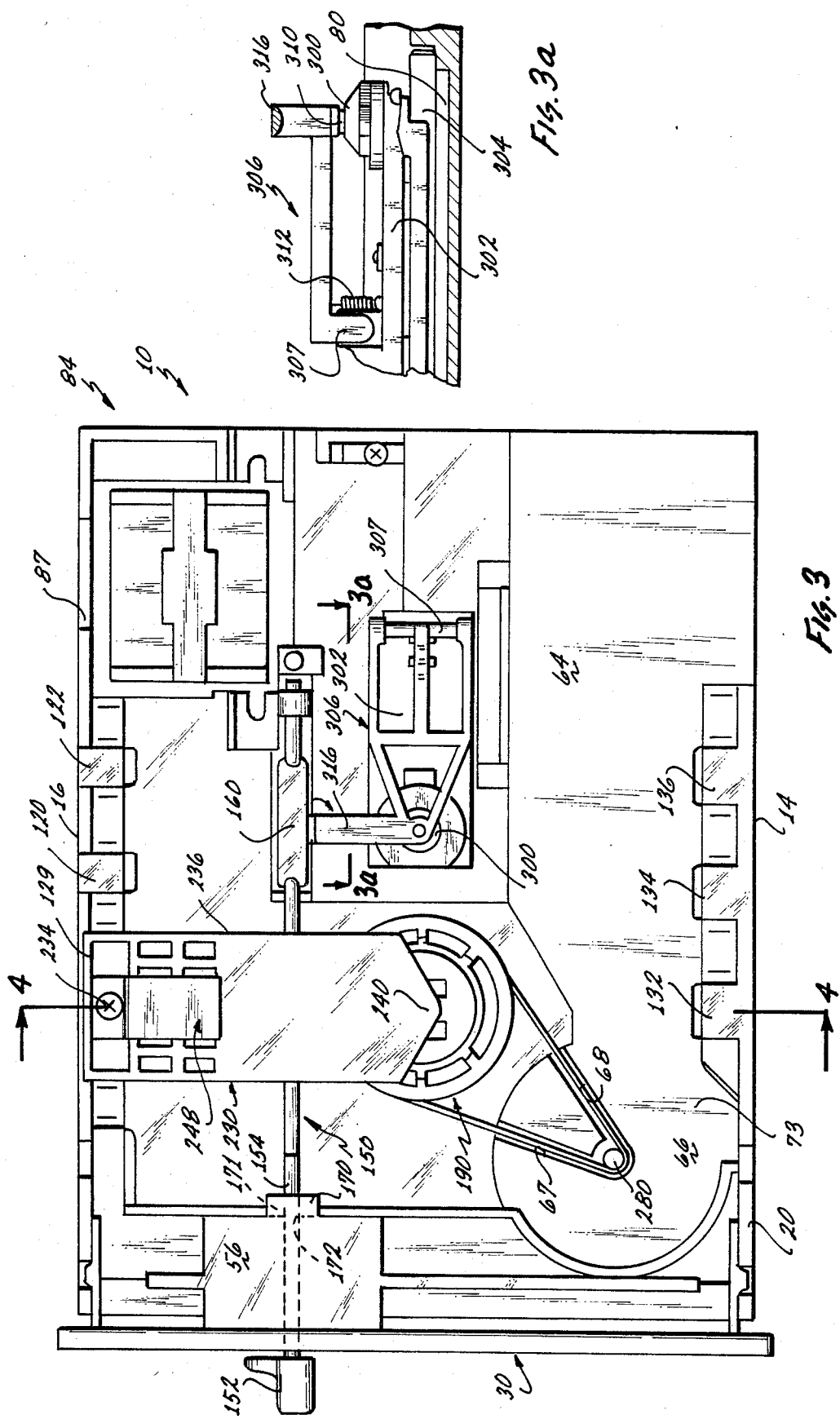
FIG. 3 is a plan view of disk drive assembly illustrating the control rod.

Reference should be had to the various views of the drawings including the isometric view, FIG. 1, the top view of FIG. 3, the various cross section views 3a and 4–6 which serve to illustrate the operation of the invention.

As may be seen in the figures, the one piece molded chassis is of generally rectangular configuration. The chassis as a whole is identified by the numeral 10. It has a front end 12, which has a configuration as may be seen best in FIG. 4 and which will be referred to again presently. It has a side 14 which will be referred to as the right side as may be seen in the figures and a side 16 which will be referred to as the lieft side, as may be seen in the figures.

Figure 4:
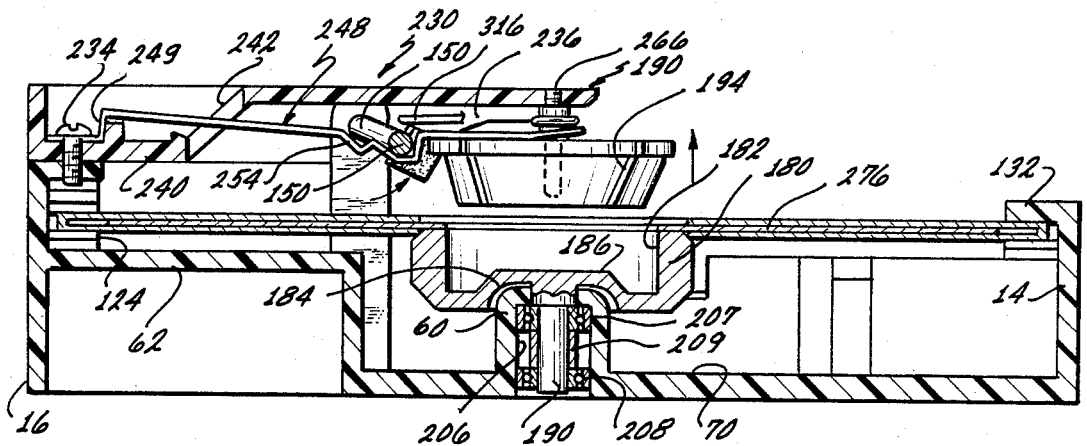
FIG. 4 is a cross sectional view taken along the line 4—4 of FIG. 3, with the drive cone not engaging the spindle.

The sides 14 and 16, at the left end as may be seen in FIGS. 3 and 4 have parts that are slightly higher as identified at 20 for the side 14 and 21 for the side 16. In the part 21 are upper and lower slots or indentations as identified at 24 and 25 and in the part 21 are similar slots or indentations 26 and 27. These slots or openings serve to form a part of a snap on holding feature for an end bezel which is designated generally by the number 30. FIG. 1 shows the end bezel snapped onto the end of the chassis.

The bezel 30 has a transverse slot 32 in it and at an intermediate part of the slot is a wider opening as designated by the numeral 34.

At the right end of the bezel 30 it has extending flexible members, these member having projections and at the opposite end of the bezel 30, there are similar flexible members with projections. When the bezel is snapped into position the shoulders on the flexible members snap into the slots 20 and 25 in the end part 20 of the side 40. The similar members at the other end of the bezel snap into the slots 26 and 27. Thus, the bezel can be readily attached or removed by hand without screws or other types of attachment and without tools.

Referring again to the left end of the chassis 10, formed at its left end are members which receive the floppy disk in its casing which is insertable through the slot 32 in the bezel 30.

Rectilinear formations 54 are formed 56 on the inside of bezel 30. These two enlarged members forming a finger housing whereby it is possible for an operator to reach through the opening 34 in the bezel 30 and into the interior of the housing 56 to extract a floppy disk in the casing. The bottom surface of the part 54 is on a slant as indicated at 55.

The configuration of the top of the chassis may be best observed from the isometric view of FIG. 1 and FIG. 3, but also from the various cross sectional views 4 through 6.

As has been explained the floppy disk in its casing is inserted at the left end through the slot 32 in the bezel 30. The chassis 10, as stated, is configured to accomodate receiving all of the mechanical and electric parts that form a part of the floppy disk drive as will be explained. The chassis accommodates the drive motor for the floppy disk and its bearing mounting and it also accommodates the stepping motor and drive mechanism for the magnetic head as well as the magnetic head itself.

The chassis also accommodates the assembly to it of the drive cone and follower for the drive spindle for the disk and the support arm and actuation spring for the drive cone. Additionally, the chassis is fabricated to accommodate assembly of the control rod which controls the actuation spring and the drive of the spindle, and a pressure pad for the disk after insertion. These parts are shown in FIGS. 1 through 6 which will be further described presently.

As previously described in connection with FIGS. 1 and 4, the diskette is inserted from the left end through the slot 32. It is guided by integral guide members formed integrally with the chassis 10, so that it comes into position with its center over the aparture in a bearing member, as designated at 60 and as may be seen in the FIGS. 1 and 4 through 6. The disk comes into position over flat platform surfaces 62 and 64 formed at the top of the chassis 10. Numeral 66 designates a circular surface at the same level as surface 64 having slots in it 67 and 68 which accommodate a belt drive for a pulley driving spindle, as will be described presently. Surface 70 is a surface around the bearing 60 which is at a lower level corresponding to the surface 72. Numerals 73 and 74 designates notches to accommdate wiring.

The surface 80 is a surface at a lower level which will accommodate the drive band for the magnetic head.

In the upper right corner of FIGS. 1 and 3 is shown the configuration designated generally by the numeral 84 which accommodates the stepper motor not shown which then drives the magnetic head. This configuration is integral with the chassis 10. The outside part of this configuration is shown in the top view of FIG. 3 and the intermediate part of this configuration. As may been seen, the side 16 has a cirucular recess 87 in it as may be seen in the figures.

The motor housing configuration 84 includes part of the side walls 16, a back wall 90 and in interior wall 92. It has a bottom wall 98 which terminates adjacent to the porition 62 which is at a higher level and a member 100 having an extending lug 102. Numeral 110 designates an upright bracket having a right angled top part 111 which form a bearing or support for the control rod for the mechanism on the floppy disk drive for controlling drive of the disk, and the actuation of the pressure pad which applies pressure to the disk and the drive of the stepping motor, as will be described presently. Bracket 110 has a foot part 113 secured to lug 102.

At the end of the part 80 at a lower level is a rectangular configuration 116. A metal band wraps around a pulley on the stepper motor for driving the magnetic head. These parts being components that are carried on the chassis 10.

When the disk is inserted in the manner described coming into a position as has been explained it is guided by integral formations formed as a part of the one piece chassis 10. As may be seen in FIGS. 1 and 3, extending inwardly from the side 16 are integral lugs 120 and 122 and below these lugs also extending inwardly are lugs 124, 126, and 128. The spacing between these lugs is such that the edge of the disk is guided between them.

On the opposite side of the chassis extending inwardly from the top of side 14 are similar lugs 132, 134, and 136. Below these guide lugs extending inwardly with respect to the side 14 are additional lugs spaced to provide a guide channel for edges of the of the diskette within its casing.

The chassis 10 is configured in a manner to be able to receive the control rod for the driving clutch mechanism and for its proper mounting in relationship to the diskette.

Figure 2:
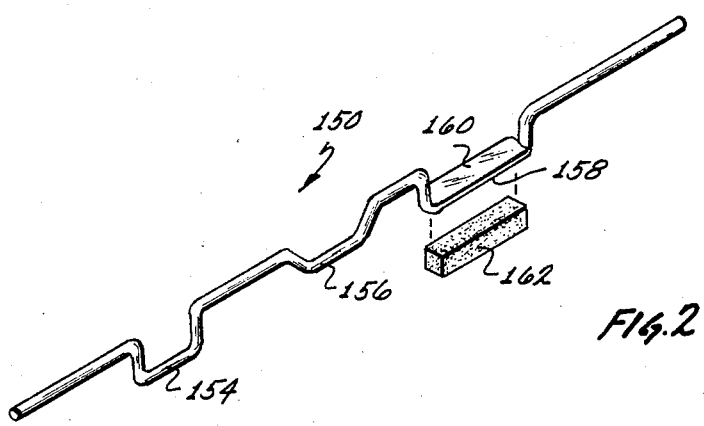
FIG. 2 is an isometric view of the control rod.

The control rod is shown in FIG. 2. It may be formed from a $\frac{1}{8}''$ diameter stainless steel rod. The manual operating handle 152 is at its end outside of the bezel 30, as may be seen in FIG. 3.

The control has a first cam lobe part 154 which operates between detent surfaces to provide positive loaded and unloaded positions of the drive cone, as will be described. Its position may be seen in FIG. 1.

Numeral 156 designates another cam lobe formed in the rod 150 which serves to operate the holding arm and actuation spring for the drive cone, as will be described.

The rod 150 has another lobe 158 in it having a flat top surface 160. This lobe carries the pressure pad 162 which is sponge-like material which applies pressure to the diskette over a platform surface as will be described. This lobe also actuates the load arm carrying a pressure pad which acts on the diskette over the magnetic head as will be described.

The relative position of the control rod and its lobes can be seen in the isometric view of FIG. 1, in the plan view of FIG. 3 and in the sectional views of FIGS. 3a, 4, 5, and 6.

Referring to FIG. 1, it will be observed that the inner face 168 of the structure 54–56 which is a finger opening for grasping the diskette has an abutment as designated by the numeral 170 which has a vertical surface 171 and a bottom surface 172. The cam lobe 154 moves relative to the surfaces 171 and 172 to determine positive loaded and unloaded positions of the drive cone which are 90° apart.

Figure 5:
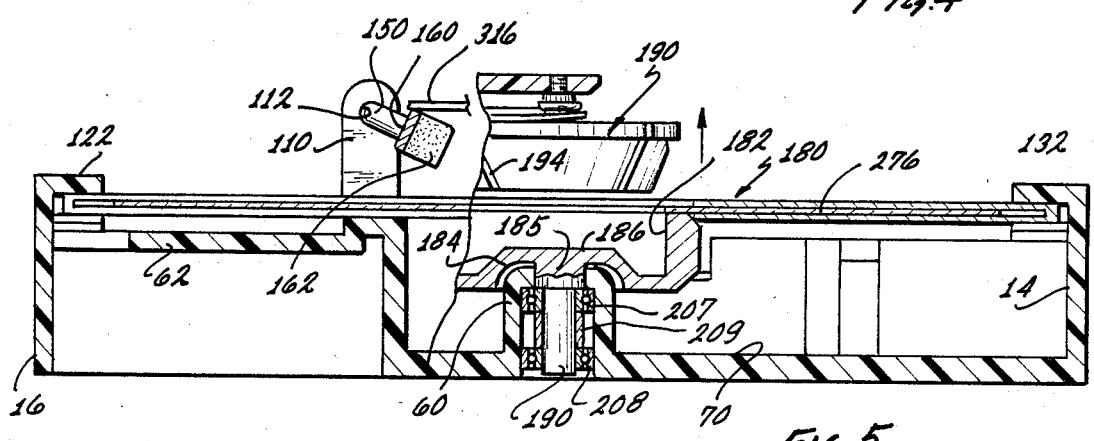
FIG. 5 is a view like FIG. 4 with the drive cone and spindle disengaged, and showing the pressure pad.
Figure 6:
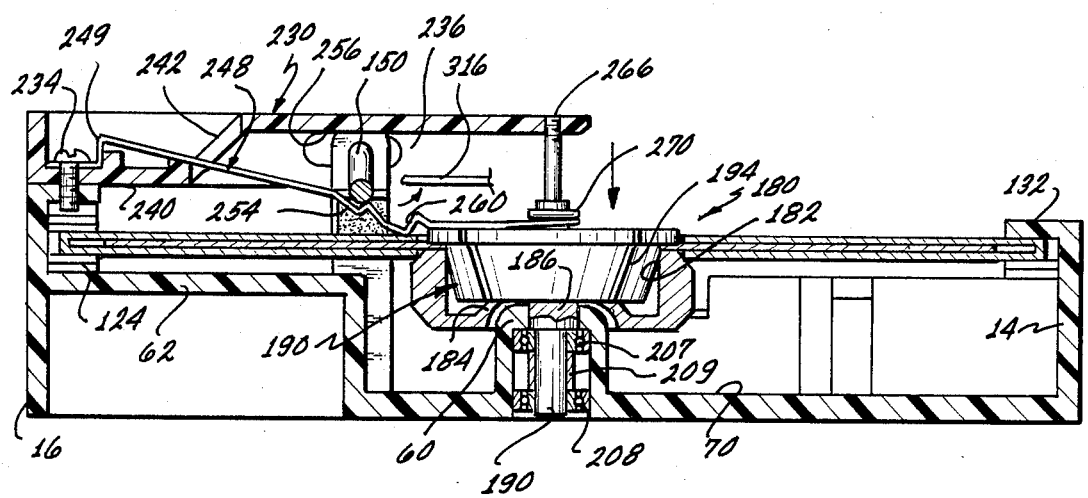
FIG. 6 is a cross sectional view like FIG. 4 showing the drive cone engaging the spindle.

The cam lobe 156 as stated operates the arm and actuating spring which moves the drive cone in between its loaded and unloaded positions. The diskette is slipped into the drive unit through the slot at the left end. The disk as shown in FIGS. 4, 5, and 6 has a center opening, as will be referred to in more detail presently.

Numeral 180 designates a drive spindle which is driven by a motor in the integral motor housing the top surface of which is identified by the numerel 66. See FIG. 3. The drive spindle 180 is cylindrical having a bore 182 which receives the drive cone, as will be described. The drive cone itself is identified by the numeral 190. It is formed with a disk 191, at its upper part and a depending cone shaped part 192 having angularly spaced slots 194 in it allowing the portions between the slots to compress and frictionally engage with the bore 182 is the drive spindle 180, as will be described more in detail presently.

At the bottom of the spindle 180 at the lower part it has a raised boss 184 with a downwardly extending stem or bushing part 185 which extends down through a top opening 186 in the upper part of the bearing housing 60. The upper part of the bearing housing is domed as shown at 187 so as to be received in the recess 188 around the boss 185 formed in the spindle 180. Part 185 is integral with shaft 190.

The bearing housing 60 has a bore 206 and received in this bore are spaced bearings 207 and 208 with a sleeve 209 in between the bearings. Shaft 190 is journalled in the bearings. In operation the spindle drives the drive cone and the disk.

FIG. 3 shows the position of the arm 230 and the actuation spring which carries the drive cone 190 and these parts are shown in cross section in FIGS. 4, 5, and 6. The arm 230 may be made of plastic. It has side parts as shown, 234 and 26, and at its left end are pins 231 and 232 which are received in openings in the support platform 129 at the top edge of side 16 of the chassis. At the left end of the member 230 it has a bottom surface 240. Numeral 242 designates an opening in this surface.

Numeral 248 designates the actuation spring which has a configuration as can be seen in FIGS. 4 and 6 which provides for positive loaded and unloaded positions of the drive cone. The left end of the actuation spring has an angular part as shown at 249 which is attached by the screw 234 to the support platform 129. It extends through opening 242.

The side walls 234 and 236 of the arm 230 have openings in them as designated at 255 and 256.

As may be seen in FIGS. 4 and 6 the actuation spring 248 has a first angular formation in it as designated at 254 and a second angular formation in it as designated at 260 to establish the positive loaded and unloaded positions. The end of the actuation spring 248 is bifurcated as may be seen at 262 in FIG. 1 and it straddles a stem 266 extending from the end of the arm 230 which is pointed as shown at 240. The pin 266 carries the drive cone 190. On the stem 266 over the bifurcated end 262 of the actuation spring is a holding member 270.

The lobe 156 of the rod 150 moves with a snap action between the angular formations 254 and 260 as will be described more in detail presently.

The driving motor for the disk is housed in an integral motor housing the top surface of which is indicated at 66 in FIGS. 3. The details of the motor are shown in application Ser. No. 427,600 filed Sept. 29, 1982 having common ownership with the herein invention. The end of the motor shaft is shown at 280. It is coupled directly to the drive spindle 180 by way of belt 282 which moves in slots 67 and 68 in the top surface 66 of the motor housing. Thus, the drive motor does not have the same axis as the drive spindle 180, but is spaced laterally from it and drives the spindle 180 directly so that no pulley is needed and the shallow profile of the entire assembly is preserved.

The magnetic head is shown at 300 in FIGS. 3 and 3a. The magnetic head is carried on sliding base 302 which can slide linearly on a rod, which is shown at 304 in FIG. 3a. Numeral 306 designates an arm having a configuration as shown in FIG. 3 and having a right angle part 307 which is pivoted on a transverse shaft. The arm 306 is biased by a spring 312.

It has a right angle end part 316 as may be seen in FIG. 3 which comes into a position that can be raised and lowered by the lobe 158 of the control rod 150. The movements of the end of this arm in response to the lobe 158 of control 150 can be seen in FIGS. 406. As shown in FIG. 6 when the drive spindle 182 is loaded the arm 316 is lowered and the pressure pad 310 applies pressure to the diskette over the magnetic head.

OPERATION AND BEST MODE OF PRACTICE

The operation of the structure as so far described will be readily understood by those skilled in the art. FIGS. 3 3a, 4, 5, and 6 illustrate particularly the operation of the control rod 150 by way of the operating handle 152. As pointed out, it has two positive positions that is, loaded and unloaded, established by the walls 171 and 172 in the plate 168.

FIG. 4 shows the control rod in the unloaded position of the drive cone 190. It is in a position above the opening in the diskette and above the bore 182 in the spindle 180. The lobe 156 of the control rod 150 is engaged in the angular formation 260 in the actuation spring 240. When the control rod is turned in a direction which is a clockwise direction in FIG. 4 the lobe 156 in the control rod moves from the angular formation 260 into the angular formation 254, so that the end of the control rod moves the drive cone 190 downwardly to a position wherein the cone part seats into the bore 182 in the spindle 180 and frictionally engages it with the diskette clamped in between the top of the drive spindle 180 and the disk 191 on the top of the drive cone. See FIG. 6. The drive motor is now in operation, operating through the belt 282. The drive spindle and the cone together drive and rotate the diskette whose position is shown in FIG. 6 with the lobe 156 rotated into the angular formation 254 in the actuation spring 248. FIG. 6 shows the driving position with the cone 190 seated in the bore 182 in the drive spindle 180 which is the driving position. In this position part 316 of arm 306 is not engaged by lobe 158 and arm 306 is lowered by spring 312 so pressure is applied by pad 310 to the disc over the magnetic head.

FIG. 5 is a cross sectional view which is taken through the lobe 158 of the control rod 150 and the pressure pad 162. This figure shows the unloaded position. The lobe 158 is turned in a counter clock wise direction so that the pressure pad 162 is lifted away from the surface so the pressure is not applied to the diskette. The end part 316 of arm 306 is lifted so that pressure pad 310 is in lifted position.

From the foregoing it can been be seen that the construction of the control rod adapts it to the low profile chassis 10 and facilitates easy manual control of the necessary functions relative to the operation of the drive unit. Positive loaded and unloaded position of the control rod are established simply by the parts 170 and 171 as described. Positive snap action operation of the drive cone is achieved by way of the angular portions in the actuation spring 248 which cooperate with the lobe 156 of the control rod, the actuation spring being attached with the arm 230.

From the foregoing those skilled in the art will readily understand the manner in which all of the objectives of the invention as set forth in the foregoing are realized.

We claim:

1. In a diskette drive assembly having a chassis frame and a channel to receive the diskette having a central opening, means including a driving spindle and drive cone cooperating with the spindle, the improvements comprising means mounting the drive cone for vertical movement relative to the chassis frame, control rod means mounted over the chassis frame and having an end extending from the front of the chassis frame, means for moving the driving cone relative to the spindle having loaded and unloaded positions, the said last means having a part engageable with the said control rod for movement between the loaded and unloaded position said part including an elongated actuation spring in a position normal to the said rod and having and end portion connected to the driving cone, said control rod having a lobe positioned to be engageable with said actuation spring, the said actuation spring having formations in it engageable with said lobe of the driving rod which establish loaded and unloaded positions of the driving cone.

2. An article as in claim 1, wherein each of said formations in said actuation spring is in the form of an angular bent part formed to positively hold the said lobe of the control rod when the lobe is engaged with the respective part.

3. An article as in claim 2, wherein said control rod has another lobe in it, the said other lobe carrying a pressure pad having a position whereby to come into contact with the diskette to apply pressure in the loaded position of the control rod.

4. An article as in claim 3, wherein the drive includes a magnetic head and loading arm with a pressure paid, actuatable by said other lobe whereby to come into contact with the diskette to apply pressure in the loaded position of the control rod simultaneously loading said arm with the pad to insure diskette contact with the head.

5. An article as in claim 1, wherein the said chassis frame includes a part having an opening in it through which the said control rod extends, means having spaced surfaces engagable by the rod, the said control rod having a further lobe which is engagable with the said surfaces in the loaded and unloaded positions of the drive cone, the said surfaces being substantially 90° apart to establish positive loaded and unloaded positions of the control rod.

6. An article as in claim 1, wherein said control rod has a lobe positioned to be engagable with said cone which establishes loaded and unloaded positions of the driving cone.

7. An article as in claim 3, wherein the drive assembly includes a magnetic head and loading arm with a pressure pad, said control rod has another lobe in it, having a position whereby the load arm over the head insures diskette cartact with the head.

8. An article as in claim 7, wherein the said chassis frame includes a part having an opening in it through which the said control rod extends, means having spaced surfaces engagable by the rod, the said control rod having a further lobe which is engagable with the said surfaces in the loaded and unloaded positions of the drive cone, the said surfaces being substantially 90° apart to establish positive loaded and unloaded positions of the control rod.

* * * * *